United States Patent [19]
Cissel, Jr. et al.

[11] Patent Number: 5,117,582
[45] Date of Patent: Jun. 2, 1992

[54] TREE IRRIGATOR

[75] Inventors: W. Lambert Cissel, Jr., 3425 Hipsley Mill Rd., Woodbine, Md. 21797; Michael J. Johnson, Madison, Wis.

[73] Assignee: W. Lambert Cissel, Jr., Woodbine, Md.

[21] Appl. No.: 513,106

[22] Filed: Apr. 23, 1990

Related U.S. Application Data

[63] Continuation-in-part of Ser. No. 329,807, Mar. 28, 1989.

[51] Int. Cl.⁵ .................. A01G 17/00; A01G 29/00
[52] U.S. Cl. .......................................... 47/25; 47/48.5
[58] Field of Search ................ 47/25, 32, 9, 73-82

[56] References Cited

U.S. PATENT DOCUMENTS

| | | |
|---|---|---|
| D. 278,075 | 3/1985 | Dryden . |
| D. 278,076 | 3/1985 | Dryden . |
| 2,022,607 | 11/1935 | Sorensen ................................ 47/76 |
| 2,938,304 | 5/1960 | Thomas et al. . |
| 3,109,258 | 11/1963 | Jensen ................................... 47/76 |
| 3,134,196 | 5/1964 | Hansen ................................... 47/76 |
| 3,142,935 | 8/1964 | Campos . |
| 3,550,662 | 12/1970 | Remke .................................. 47/76 |
| 3,634,970 | 1/1972 | Williams ................................ 47/76 |
| 3,711,992 | 1/1973 | Martin . |
| 3,727,345 | 4/1973 | Smith . |
| 3,860,172 | 1/1975 | Platt . |
| 4,087,938 | 5/1978 | Koch . |
| 4,137,667 | 2/1979 | Wallace et al. . |
| 4,144,673 | 3/1979 | Quast et al. . |
| 4,267,665 | 5/1981 | Wallace et al. . |
| 4,336,666 | 6/1982 | Caso . |
| 4,502,244 | 3/1985 | Yoham . |
| 4,604,825 | 8/1986 | Mainprice ............................. 47/76 |

OTHER PUBLICATIONS

"Nursery News" May 7, 1988.
Caleb Industries Advertisement.

*Primary Examiner*—David A. Scherbel
*Assistant Examiner*—Michele A. Van Patten
*Attorney, Agent, or Firm*—Jones, Tullar & Cooper

[57] ABSTRACT

A tree irrigator utilizes at least a first flexible tree encircling container which may receive a substantial volume of a tree irrigating liquid and which will slowly disperse the liquid to the tree over a period of time. Each flexible container has at least a base portion which provides for the discharge of the irrigating liquid to the root ball of the tree. Either a single container may be placed about the trunk of the tree or two cooperating containers can be joined together in a tree encircling configuration.

15 Claims, 10 Drawing Sheets

TREE IRRIGATOR

CROSS-REFERENCE TO RELATED APPLICATION

This patent application is a continuation-in-part of patent application Ser. No. 329,807, filed Mar. 28, 1989.

FIELD OF THE INVENTION

The present invention is directed generally to a tree irrigator. More particularly, the present invention is directed to a slow dispersion rate, trunk encircling tree irrigator. Most specifically the present invention is directed to a flexible, shape sustaining, tree trunk encircling, container or containers each having an outer shell or container with water exit holes generally in a bottom portion. An inner liner or container bottom liner with a water discharge aperture may be placed within the outer shell or container. The tree irrigator of the present invention provides for the continuous slow rate delivery of irrigating liquid to the roots of a tree, and is shaped to be free standing, to closely engage, and to be securable to, the lower trunk of the tree. A sufficient volume of tree irrigating liquid is held within the tree irrigator for release at a controlled rate so that the root ball of the tree will receive adequate moisture but will not be over-watered.

DESCRIPTION OF THE PRIOR ART

A tree which has been dug up for transplanting has typically lost a large portion of its root system. Thus, when it is transplanted, it needs to be supplied with sufficient water to insure that it will survive transplantation and will adapt well to its new location. When a landscape contractor or nurseryman transplants a young tree, typically one having an attached root ball which may also be encased in burlap or the like, he, or one of his laborers, will water the tree. This is often done by using a hose and by drenching the area around the base of the tree and root ball. Subsequent waterings are apt to be the responsibility of the property owner, if the tree has been planted on private property. If the tree has been planted in a public area, such as along a highway or in a park, the subsequent waterings needed to insure survival of the transplanted tree may be done on a sporadic basis at best. Transplanted trees are thus quite apt to die from inadequate water. This high rate of loss, which often requires replacement, increases the costs which are ultimately passed along to the purchaser.

A newly transplanted tree, with its attached root ball, can retain only a limited amount of water due to the loss of a significant portion of its root system during transplantation. Once the root ball and surrounding soil have been drenched, the remainder of any water which may be concurrently applied merely runs off. Thus the time of the laborer or property owner spent while holding a hose and directing water which is merely running off, is wasted. This excess watering is thus wasteful of both time and water. It may also result in damage to the tree since there may be applied such an excess of water that the tree will be overwatered to the point of having it's roots being deprived of needed oxygen.

Watering a newly transplanted tree by applying a large volume of water in a short period of time is also apt to be ineffective for other reasons. Besides the limited capability of the tree's root ball and surrounding soil to absorb this large amount of water, as discussed above, problems also often arise when the tree is located on sloping ground. In a situation such as this, the water is apt to run off and away from the tree trunk and its root ball. Even when the ground surrounding the tree is flat, the water will be apt to spread so far away from the tree's root ball that the watering will be ineffective.

Established trees may also frequently need supplemental watering for various reasons. In the middle of the summer typically when a prolonged dry season may be encountered, it is often important to adequately water established trees. The sporadic use of a hose to attempt to water these trees is frequently quite ineffective.

Several other instances may arise when it is desirable or necessary to deliver water to the base of a tree at a controlled rate. For instance, a tree which has been previously dug from the ground in anticipation of being transplanted, and whose root ball may have become very dry, may require watering while it is awaiting return to the ground. Similarly, when an established tree is to be dug from the ground for transportation and transplantation, it is desirable to thoroughly moisten the soil around the tree so that it can be more easily dug up by mechanical or manual means. Additionally, there frequently arises the need to apply chemicals and fertilizers to the root system of the tree in a controlled, predictable manner.

Various attempts have been made in the past to provide tree watering devices which will deliver water to the base of a tree at a controlled rate. Exemplary of such prior art devices are the apparatus for nurturing trees disclosed in U.S. Pat. No. 3,711,992 to Martin, and in the tree watering device shown in U.S. Pat. No. 4,087,938 to Koch. In both of these devices there are shown generally rigid tanks which are assembled about, or placed around the trunk of a tree. Water is placed in the tank and flows out through ground piercing perforated tubes or through radially outwardly extending flexible trickle tubes. In each of these prior art devices, the tank used to hold the water is a relatively large and somewhat cumbersome rigid structure which is not easily transportable from place to place and which would clearly require a substantial outlay of capital to acquire.

These prior art tree irrigating devices utilize tubes having holes, or other similar flow outlets to supply the irrigating liquid to the ground surrounding the tree. Such trickle tubes and valved discharge devices are susceptible of clogging. The effective watering of the tree depends on a controlled flow of liquid to the tree and its root ball. If one or more of the trickle tubes or apertured flow delivery pipes becomes clogged by dirt, the effectiveness of the device is decreased.

Rigid tanks, such as are used in various ones of the prior art devices, cannot be readily adapted to trees of different sizes or to trees having other than straight trunks, and are difficult to install and retain in place on sloping terrain. Further, a rigid, non-yielding tank or container installed about the trunk of a tree be apt to damage the tree if the tree is caused to rub against, or come into contact with the side of the tank as the tree moves, for example by swaying in the wind.

For the above discussed reasons, as well as for the practical considerations of storage, transportation, aesthetics and the like, the various prior art devices used to provide controlled irrigation to the base of a tree have not been particularly successful. There thus exists a need for a tree irrigator which will overcome the deficiencies of the prior art devices while not having its own drawbacks. The tree irrigator in accordance with the present invention provides a highly practical and satisfactory device which is a significant advance in the art.

SUMMARY OF THE INVENTION

It is an object of the present invention to provide a tree irrigator.

Another object of the present invention is to provide a controlled rate tree irrigator.

A further object of the present invention is to provide a flexible, shape sustaining, free standing tree irrigation liquid container having water discharge openings.

An additional object of the present invention is to provide a tree irrigator having an outer shell and an inner water holding liner.

Even a further object of the present invention is to provide a tree irrigator having a water retaining container whose bottom is provided with water discharge openings and having an inner bottom liner which is water permeable.

Another additional object of the present invention is to provide a tree irrigator having a gussetted, shape sustaining, free standing container with spaced water discharge openings.

Yet another object of the present invention is to provide a tree irrigator which will accommodate to the shape of a tree trunk.

Still a further object of the present invention is to provide a tree irrigator positionable about a tree trunk directly atop the tree root ball.

Even yet another object of the present invention is to provide a tree irrigator which will not harm the tree.

Still yet a further object of the present invention is to provide a tree irrigator which is inexpensive, requires little field set up, and which is easily transported and stored.

As will be discussed in greater detail in the description of preferred embodiments, which are set forth subsequently, the tree irrigator in accordance with the present invention utilizes one or more flexible, free standing, shape sustaining container or containers, each of which is shaped to be positionable about the base of a tree and directly atop the tree's root ball. A single container may be used by itself or two similar containers may be connected together to form the tree irrigator. Each flexible container or assembly of containers preferably has an generally truncated cone-like shape which provides each container with great stability. In a first preferred embodiment, each container used to provide the tree irrigator includes an outer shape sustaining shell that is provided with a plurality of water exit openings in its base surface, and an inner water holding liner which has at least one discharge opening in its bottom. Water is held in the liner and flows from the liner and through the exit openings in the base of the outer shell. Spacing means are placed between the bottom of the liner and the base of the shell to facilitate water flow. The discharge rate of this embodiment of the tree irrigator is dependent on the number and sizes of exit openings in the shell's base and the discharge opening in the inner liner.

In a second preferred embodiment, each container for the tree irrigator has a shape sustaining and water holding container provided with a bottom that has a plurality of water exit openings. A water permeable or apertured bottom liner overlies only the container bottom and may be separated therefrom by spacing means.

In a third preferred embodiment, the tree irrigator is formed as a single container and having water permeable portions of at least the bottom wall so as to provide a continuous, slow dispersal of the liquid in the container to the tree's root ball and surrounding soil. Depending on the permeability of the flexible material used, and the water absorptive characteristics of the soil in the locale in which the flexible tree irrigator is to be used, the amount of water permeable surface areas as a percentage of the total area of the flexible water holding device can be varied during manufacture of the tree irrigator.

In a fourth preferred embodiment, the tree irrigator is again formed of one or more individual, freely standable, shape sustaining, water holding containers. Each of these containers has a gussetted wall shape to make it very stable. Spaced leak holes are provided generally in the bottom of the gusset container and allow irrigating liquid to flow from each container. Each of the containers of this fourth preferred embodiment utilizes a single layer wall and bottom with reinforcing materials in the gusset bottom seams to facilitate heat sealing of the container.

The tree irrigator in accordance with the present invention may, for example have a capacity of fifty gallons of water which it will slowly disperse, for over a period of from four hours to four days, depending on the selected sizes of the discharge opening or openings in the liner or container, or the material's permeability. This slow dispersal is done without any manpower being required. Thus the landscaper's employees do not have to periodically return to water the tree. Alternatively, the survival of the tree and its proper watering does not depend on a possibly inattentive property owner. Thus the tree irrigator of the present invention operates independently to supply water and nutrients, if desired, to a tree in a controlled manner.

The tree irrigator is placed about the tree with its water discharging base directly on top of the root ball. This insures that the water supplied to the tree is directed to the point where it is needed. In contrast to prior watering procedures which used a hose to drench an area, the tree irrigator of the present invention supplies the irrigating water at a controlled, slow rate and in an amount which will not overwhelm the soil's ability to absorb it. Additionally, since the irrigating liquid is supplied at a slow rate, it will be absorbed by the soil and will not run off, even if the tree has been planted on sloping ground.

The flexible materials used in the construction of the several preferred embodiments of the tree irrigator of the present invention provide a container having many substantive advantages over the rigid tanks or containers utilized in prior art devices. The flexible tree irrigator will adapt to changing ground contours and slopes and is useable with trees having various calipers and with other than straight trunks. The flexible container or containers which surround the trunk of the tree will not push on the tree as would be the situation with a rigid tank, particularly if the tree were planted on sloping ground. This is accordingly less stressful to the tree. Similarly, since the irrigating liquid is held in a flexible container about the tree, the tree can move with the wind while not damaging its bark. Further advantages of the flexible tree irrigator of the present invention include its ability to be easily rolled or folded for storage and transport. It is also light in weight, inexpensive, and easily repaired if punctured.

In the first and second preferred embodiments of the tree irrigator of the present invention, the base of the outer shape sustaining shell or container is provided with a plurality of spaced exit openings for the liquid. These holes are of a size that will not clog or become obstructed by dirt or small rocks or pebbles. The discharge opening or openings in the bottom of the water holding liner or the container bottom liner are shielded from the outside environment by the outer shell and also are of a size that will not become blocked or clogged with dirt, stones or debris. In the third preferred embodiment, in which the tree irrigator of the present invention uses a water permeable material to allow the water it contains to be slowly dispersed into the root ball and surrounding soil, this water permeable material may have thousands of tiny holes which leak water at a constant rate. These holes also will not become clogged by dirt or debris, as is apt to happen with trickle tubes or apertured pipes. In the fourth preferred embodiment there are again provided one or more discharge openings in the container, generally in the area adjacent the gusset fold. These discharge openings are overlaid by a plastic netting and, when each container is in place, these discharge openings allow irrigation liquid to flow directly into the ground and to the root ball of the tree. Thus the tree irrigator of the present invention, in any of the preferred embodiments, will perform its function in a predictable and dependable manner.

The tree irrigator of the present invention provides a simple, dependable, accurate device for supplying water to a newly transplanted tree, to a tree which is to be removed from a nursery and whose surrounding soil needs to be loosened, or to established trees in need of watering or treatment with water dissolvable fertilizers and insecticides. It is simple to use yet highly predictable; it can be easily stored and transported; and it requires little time to set up in the field. The tree irrigator further is not expensive to make or use, and will not damage a tree about which it is placed. It thus overcomes the deficiencies of prior devices and provides a readily utilizable device.

BRIEF DESCRIPTION OF THE DRAWINGS

While the novel features of the tree irrigator in accordance with the present invention are set forth with particularity in the appended claims, a full and complete understanding of the invention may be had by referring to the detailed description of the preferred embodiments, as is set forth subsequently, and as may be seen in the accompanying illustrations in which:

DESCRIPTION OF THE PREFERRED EMBODIMENTS

Figure 1:
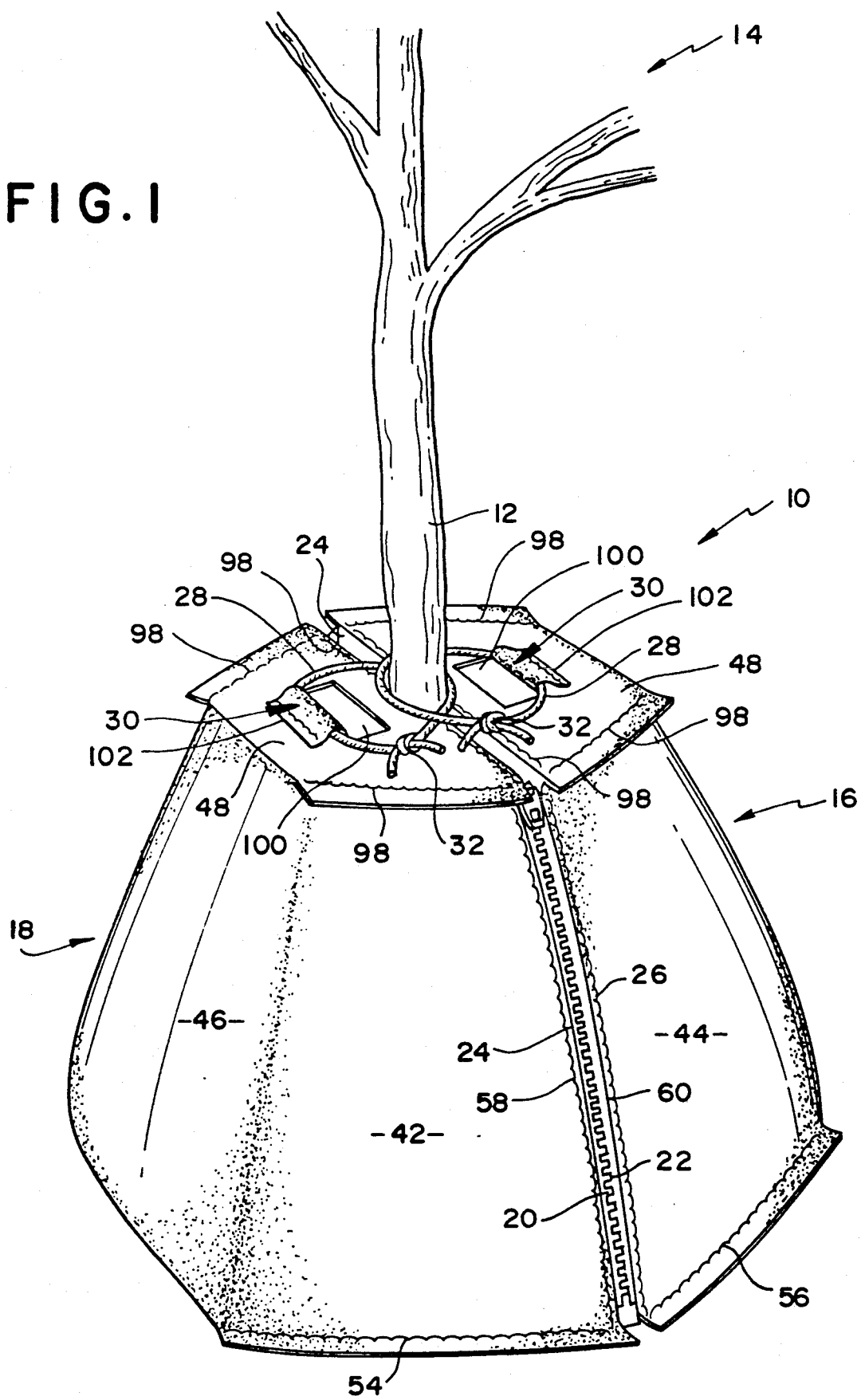
FIG. 1 is a perspective view of a first preferred embodiment of a tree irrigator in accordance with the present invention and showing the device in place about a tree.

Turning initially to FIG. 1, there may be seen a first preferred embodiment of a tree irrigator in accordance with the present invention. Tree irrigator 10 is depicted in place about the trunk portion 12 of a tree which is shown, generally at 14. This tree 14 is depicted in FIG. 1 quite schematically. It will be understood that the tree 14 could be an established tree, a tree that is about to be dug for transplantation, a tree which has been dug but not yet relocated, a newly transplanted tree, or a tree which may need to be provided with nutrients, or systemic insecticides or the like. In any of these instances, the first preferred embodiment of tree irrigator 10 is intended for use to supply liquids, such as water or water and chemical mixtures to the root ball of the tree in an efficient, expeditious manner.

As may be seen in FIG. 1, the first preferred embodiment of tree irrigator 10 is preferably formed by joining together two identical water containers 16 and 18. Each container 16 or 18 is generally shaped as one half of a truncated cone or pyramid so that when the two identical water containers are joined together, as seen in FIG. 1, they form a generally truncated cone shaped tree irrigator 10 which encircles or surrounds the trunk 12 of tree 14. This attachment or joining of the two identical water containers 16 and 18 to each other is preferably accomplished by providing each container with one male zipper segment 20 and one female zipper segment 22. These zipper segments are attached along opposite vertical edges 24 and 26, respectively of each water container. Since the containers are identical, when they are placed in face to face engagement, as seen in FIG. 1 the male zipper 20 on container 18 will be adjacent the female zipper 22 on container 16. Thus the two containers 16 and 18 can be zipped together to form the tree encircling tree irrigator 10 of the first preferred embodiment. It will be understood that while zippers 20 and 22 are a preferred means for joining the two identical water containers 16 and 18 together, that other suitable fastening devices, such as, for example, snaps, buttons, hook and loop type fasteners, eyelets and string or rope, and the like could be used. Furthermore, while not specifically depicted, it will be understood that a single water container 16 or 18, since each such container carries cooperating fastening means such as zipper segments 20 and 22 on its spaced vertical edges 24 and 26, can be placed in an encircling position about a tree 14 and fastened in place. This may be desirable where tree 14 is quite small or perphaps where one container of the typically cooperating pair has been rendered unusable and a replacement is not readily available. Thus the one remaining viable container can be used by itself.

As is also shown in FIG. 1, each water container 16 and 18 may be attached to the trunk 12 of tree 10 by utilizing a suitable trunk encircling rope tie 28. Each rope tie 28 passes through a rope holder 30 that is formed in the top surface of each container 16, 18, as will be discussed shortly in more detail. Once each rope tie 28 has been passed through rope holder 30 and has been placed about tree trunk 12, it can be tied in a knot 32 to further hold the water container 16 and 18 in place.

Figure 2:
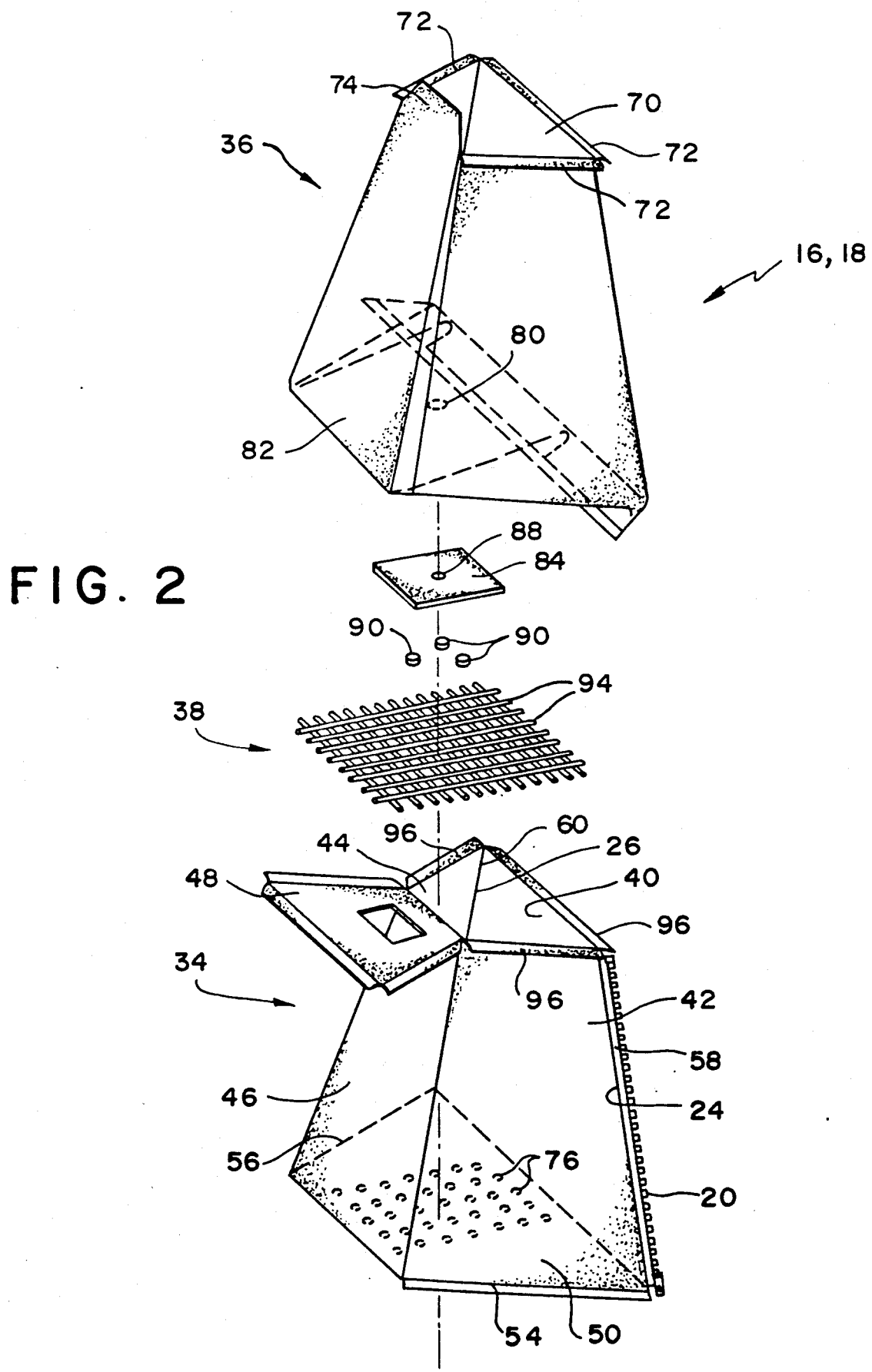
FIG. 2 is an exploded perspective view of one water container in accordance with the first preferred embodiment and depicting the outer shape sustaining shell and the inner water holding liner.
Figures 5, 6, 7:
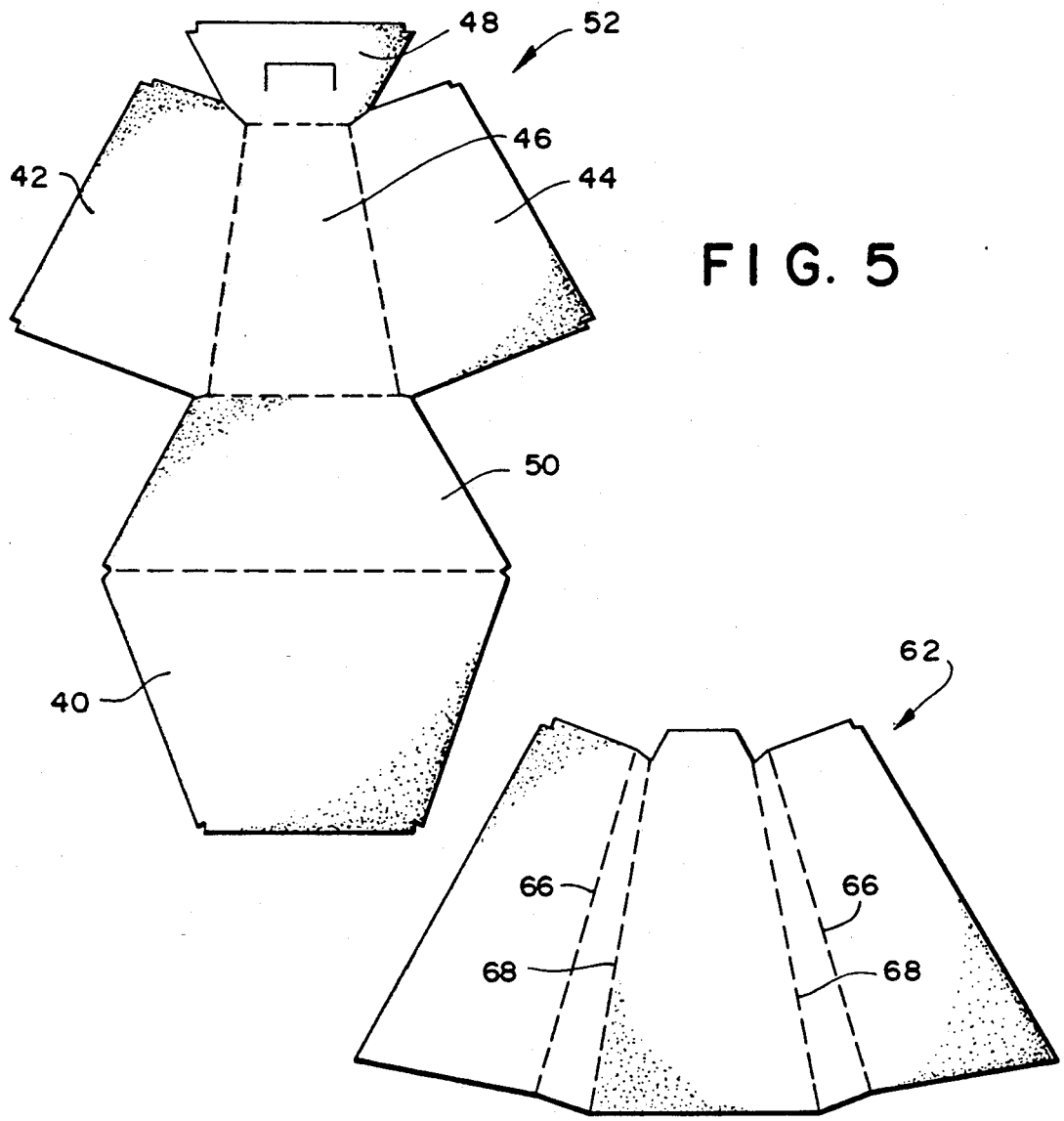
FIG. 5 is a plan view of the outer shell of the first and second embodiments prior to its being folded and seamed.
FIG. 6 is a plan view of the outer wall of the liner.
FIG. 7 is a plan view of the inner wall of the liner.

Referring now to FIG. 2, there is shown in exploded perspective one of the water containers 16, 18 of the first preferred embodiment of the tree irrigator 10 of the present invention. Each water container 16, 18 includes an outer shape sustaining shell 34, an inner water holding liner 36, and a screen segment 38 which is placed between bottom portions of the liner and shell, as will be discussed subsequently. Outer shape sustaining shell 34, when in its assembled, erected position is generally in the shape of one half of a truncated cone or a generally six-sided pyramid. It includes an inner, generally planar face 40, outer side surfaces 42 and 44, an outer central surface 46, a top flap 48 and a base 50. These various portions of the outer shape sustaining shell 34 are also seen in FIG. 5 which shows shell 34 as it would appear when first cut as a shell blank from a piece of material. In the preferred embodiment, outer shape sustaining shell 34 is a poly-tarp material such as is commercially available from Amoco Fabrics and Fibers Co. of Atlanta Georgia as their Product No. 6885. A poly-tarp material such as this has excellent strength and stitch resistance. The purpose of the outer shell 34 in this first preferred embodiment is to provide shape and support for the inner water holding liner 36.

As discussed above, the shell 34 is cut as a one piece blank 52 from a sheet of suitable poly-tarp material. The unfolded pattern shape of shell 34 lends itself well to closely staggered positioning of multiple shell blanks 52. This means that there is very little waste material. The blank 52 for shell 34, as shown in FIG. 5, is then assembled into the configuration shown in FIG. 2 by folding of the blank 52 along the various dashed fold lines. Once folded, the shell is stitched along the stitch lines 54 and 56 between the outer side surfaces 42 and 44 and base 50, respectively. The vertical side seams 58 and 60 between the inner edges of side surfaces 42 and 44 and inner face panel 40 are also stitched, and the zipper segments 20 and 22 are secured in place. Once the inner liner 36 and separating screen 38 have been placed within outer shell 34, the top flap 48 can be stitched along its three free sides to the tops of outer side surfaces 42 and 44 and inner face 40. Since the outer shape sustaining shell 34 is not water retentive in the first preferred embodiment, these stitches need not be waterproof. It will be understood that other joining or attachment techniques, which would be compatible with the material used for outer shell 34 could also be used.

Referring again to FIG. 2 in conjunction with FIGS. 6 and 7, inner water holding liner 36 is generally in the shape of a gusset bag which is made by using an outer liner wall blank 62 as seen in FIG. 6, and an inner liner wall blank 64, as seen in FIG. 7. The outer liner wall blank 62 and the inner liner wall blank 64 are cut from any suitable polyethylene material which is commercially available from a number of supply sources. Preferably this polyethylene has a thickness of about 4 mils. The outer liner wall blank 62 is gusset folded along fold lines 66 and 68 and then the two liner blanks 62 and 64 are sealed together along the three corresponding sides of the two blanks to provide the inner liner 36. As seen in FIG. 2, inner water holding liner 36 has an open mouth 70 which is bounded by three stitching flaps 72 and a mouth flap 74.

Returning to FIG. 2 and also referring to FIG. 3, the assembly and operation of each water container 16 will now be discussed. The base 50 of outer shape sustaining shell 34 of each water container 16 is provided with a plurality of water exit openings 76. There are typically provided a substantive number of these exit openings spread over the surface of shell base 50. It has been found that the ability of the tree irrigator to disperse water is hampered by the saturation of the soil in the immediate vicinity of the exit holes. Thus by providing a large number of exit holes 76 distributed over a large area of the base 50 of the outer shell 34, the tendency of the tree irrigator toward saturation back-up is greatly reduced and the leakage rate of the bag is made more independent of soil type. In the first preferred embodiment, these exit openings typically have a size of generally about 1/16 to ⅛ inch diameter. These exit openings 76 are most conveniently formed in the base 50 of the outer shell 34 before the blank 52 of FIG. 5 is folded.

After the outer shape sustaining shell 34 has been folded and the bottom and side seams 54, 56, 58 and 60 have been sewn or otherwise formed, but before the outer shell's top flap 48 has been folded down and secured in place, a segment of screening 38 is placed within the shell overlying the pattern of exit openings 76. The screen segment 38 in the preferred embodiment is a plastic mesh having apertures which are generally about 3/16 inch on a side. Such plastic screening is readily commercially available from a number of suppliers. A preferred propylene netting is available from Internet Inc. of Minneapolis, MN as their Product OV-7100. As will be discussed shortly, the inner liner 36 has a discharge opening in its bottom portion. If the screen 38 were not interposed between the base 50 of the outer shell and the bottom of the inner liner 36 the exit openings 76 in the base 50 of the shell 34 could be obstructed by the liner 36. The screen segment 38 interposed between the shell base 50 and the bottom of the inner liner 36 enables the water from the liner to reach all of the exit openings 76 without interference. The screen segment may have any convenient shape so long as it overlies the exit openings 76.

The flexible inner water holding liner 36 is formed from the two liner blanks 62 and 64, as shown in FIGS. 6 and 7 by heat sealing or other suitable means to form the water tight liner 36. Since liner 36 will conform to the shape of outer shape sustaining shell 34, it does not itself have to have any structural rigidity. Since inner liner 36 is a gusset type bag, it can be made using straight line heat seams. Thus it is easy to fabricate from the two liner blanks in as uncomplicated manner. Once the inner liner 36 has been placed inside the outer shell 34 and filled with water, it will conform to the shape of the shell 34.

The flexible inner water holding liner 36 has a water discharge opening 80 located in a bottom portion 82 thereof. The size of this water discharge opening 80 may be selected to provide a desired bag emptying rate. For example, if the bag were to have an emptying time of 4 hours, discharge opening 80 would be larger than it would if the water container 16, 18 were to have an emptying time of 48 hours.

Figure 3:
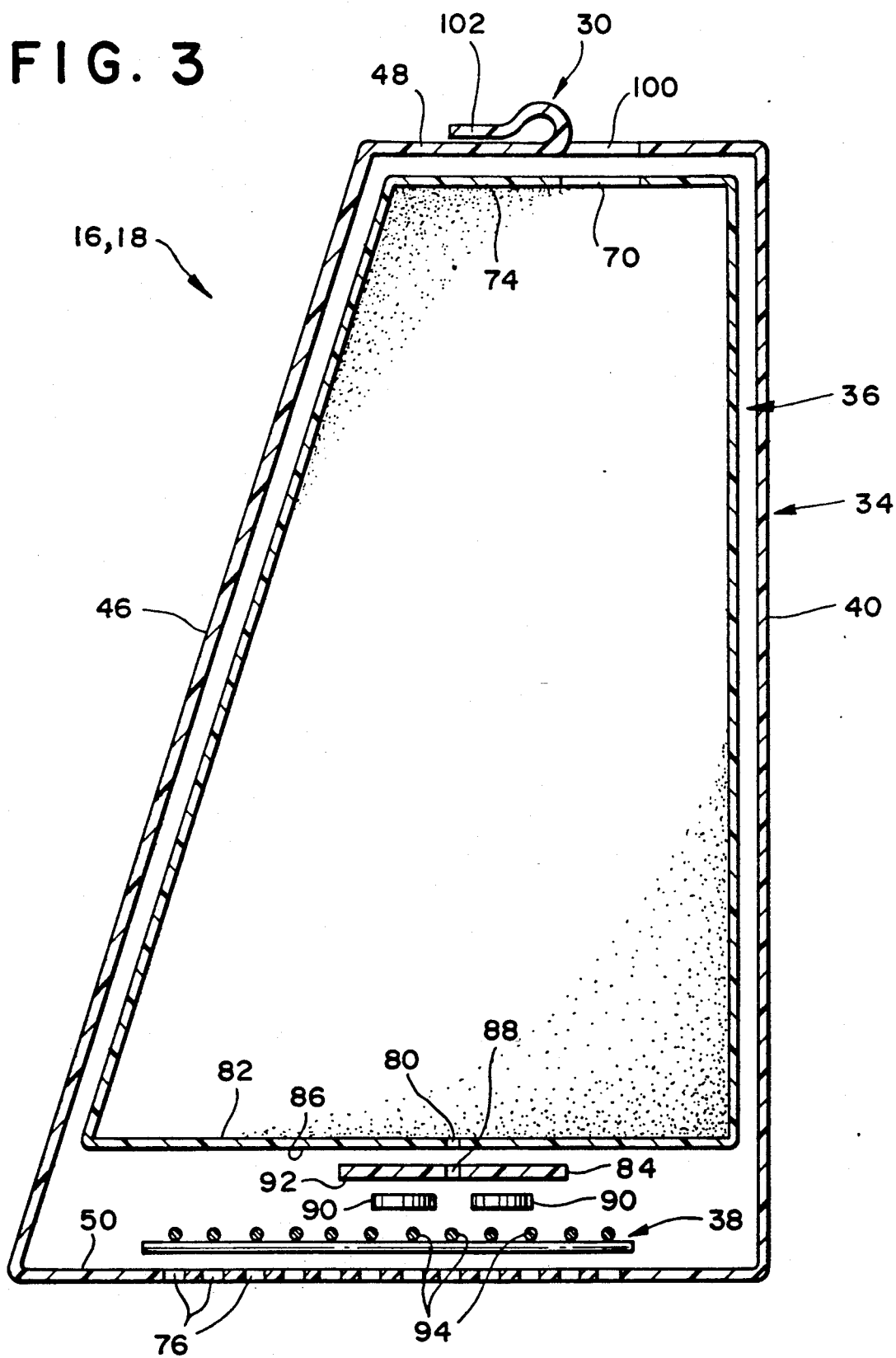
FIG. 3 is a cross-sectional side elevation view of the water container of FIG. 2 when assembled.

A reinforcing patch 84, as seen in FIGS. 2 and 3, is securely affixed to a lower surface 86 the bottom 82 of inner water holding liner 36. This reinforcing patch 84 has a water discharge aperture 88 which is aligned directly beneath the water discharge opening 80 in the bottom portion 82 of the inner liner 36. Since the inner liner 36 is fabricated from thin polyethylene film or the like, the reinforcement patch 84 insures that the size of the water discharge opening 80 does not change with time, and further insures that this portion of the bottom 82 of the liner will be wrinkle free so that there is no blockage of the liner's water discharge opening 80. The reinforcing patch 84 may be attached to the undersurface 86 of the inner liner 36 by any suitable means. It would be possible to provide a size variable water discharge opening in liner 36. This could be accomplished by substitution of a suitable adjustable sized orifice for the fixed water discharge aperture 88 in the reinforcing patch 84, if desired.

A plurality of spacers 90 are affixed to a lower surface 92 of reinforcing patch 84. These spacers are positioned about water discharge opening 88 in patch 84 and may be of any desired configuration. The purpose of these spacers is to separate the lower surface 92 of patch 84 from the screen segment 38. This insures that one of the screen rods 94 will not obstruct the water discharge aperture 88 in the reinforcement patch 84 so that water can flow freely out through the water discharge opening 80 in the inner water holding liner 36. It will be understood that spacers 90 are joined to patch 84 and that the patch is, in turn secured to the bottom 82 of the liner 36 before the liner 36 is placed within the outer shell 34.

As discussed previously, outer shell 34 is erected with the top flap 48 unsecured. Once the shell 34 has been so erected, the screen segment 38 is placed within it and rests on the base 50. The previously assembled inner liner 35, which includes reinforcement patch 84 and spacers 90, is now placed within the outer shell 34. The stitch flaps 72, which bound the open mouth 70 of the inner liner, are placed atop corresponding outer shell flaps 96 which are located at the upper ends of the inner face 40 and the two outer sides 42 and 44 of the outer shell 34. The top flap 48 of the outer shell is then placed in its closed position, as seen in FIG. 1 and is stitched down along stitch lines 98. This will secure the inner liner 36 in place within the outer shell 34.

As may be seen most clearly in FIGS. 1 and 2, the top flap 48 of the outer shell 34 of each water container 16, 18 has a rope holder 30, which was discussed previously. This rope holder 30 is formed by providing a mouth aperture 100 in top flap 48 of outer shell 34. A mouth flap 102, which is liberated during the forming of outer shell mouth aperture 100, is turned back over on itself and is stitched to the outer shell top flap 48 to thereby provide rope holder 30. In stitching mouth flap 102 to top flap 48 of the outer shell 34, the mouth flap 74 of the inner liner 36 is also stitched to the undersurface of the top flap 48 thereby further securing the inner water holding liner 36 in the outer shape sustaining shell 34 of each of the water containers 16 and 18 and to thereby form the first preferred embodiment 10 of the tree irrigator in accordance with the present invention.

As has been discussed previously, two identical water containers 16 and 18 are preferably placed in opposition to each other so that their inner faces 40 are adjacent each other. When in this position, the two water containers 16 and 18 are secured together by using the male and female zipper segments 20 and 22. Now a suitable volume of water may be placed in each inner water holding liner 36 through outer shell mouth aperture 100 and cooperating open mouth 70 of liner 36. This water will pass out of inner liner 36 through water discharge opening 80, thence through water discharge aperture 88 in reinforcing patch 84 and will pass around the screen rods 94 and through the water exit openings 76 in the base 50 of the outer shape sustaining shell 34.

As may be seen in FIG. 1, the overall shape of the tree irrigator 10, and of each of the other preferred embodiments to be discussed subsequently, is generally cone-shaped. The forces placed on the outer walls 42, 44 and 46 of each of the water containers are generally perpendicular to the walls. In the case of these somewhat cone-shaped bag, this force has an upward component that causes the filled water containers 16 and 18 to be free standing in a stable manner. In the first preferred embodiment, the incline of these outer walls 42, 44, and 46 of the outer shape sustaining shell is generally about 17 degrees. This provides a stable, freely standing tree irrigator 10 while still providing adequate water capacity.

Figure 4:
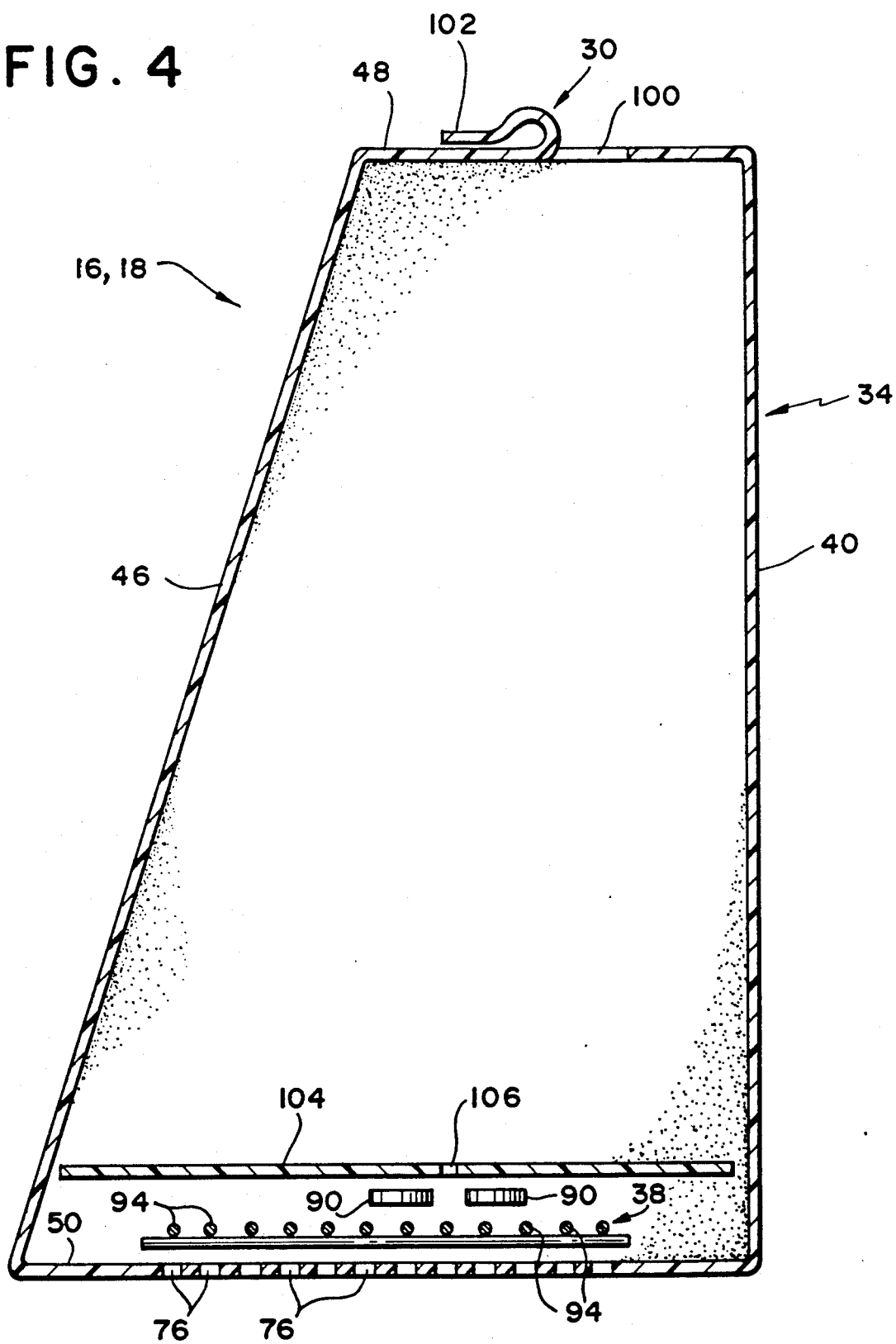
FIG. 4 is a cross-sectional side view of a second preferred embodiment of a tree irrigator in accordance with the present invention and showing a water holding container with a container bottom liner.

Referring now to FIG. 4 there may be seen a second preferred embodiment of a tree irrigator in accordance with the present invention. This second preferred embodiment is generally similar to the first preferred embodiment and similar numerals are utilized in both embodiments, where appropriate. In the first preferred embodiment, the outer shell 34 of each water container 16 was discussed as being shape sustaining but not water retentive. In this second preferred embodiment, the outer shell 34 of each generally similar container is both shape sustaining and water retentive. This outer shell 34 of containers 16 and 18 has a base 50 which is provided with a plurality of water exit openings 76. However, in this second preferred embodiment, since the outer shell 34 of each container 16 and 18 is water retentive, there is not need for inner liner 36. Instead, as may be seen in FIG. 4 there is provided an outer shell or container bottom liner 104. Container bottom liner 104 may have a water discharge opening 106 which is similar in size to water discharge opening 80 in the inner liner 36 of the first preferred embodiment.

The container bottom liner 104 of the second preferred embodiment depicted in FIG. 4 is sized to generally overlie the base 50 of the outer shell 34. Suitable spacers 90 and a screen segment 38 may be placed between container bottom liner 104 and the inner surface of outer shell base 50 before the perimeter of container bottom liner 104 is suitably secured to the outer shell base 50 generally outside the area defined by the water exit openings 76 in base 50. It will be understood that the water discharge opening 106 in the container bottom liner 104 cooperates with spacers 90 and screen segment 38 in a manner similar to that discussed in conjunction with the first preferred embodiment. Alternatively, the container bottom liner 104 may be made of a water permeable material which could be attached to outer shell base 50 directly atop the water discharge openings 76.

Figure 8:
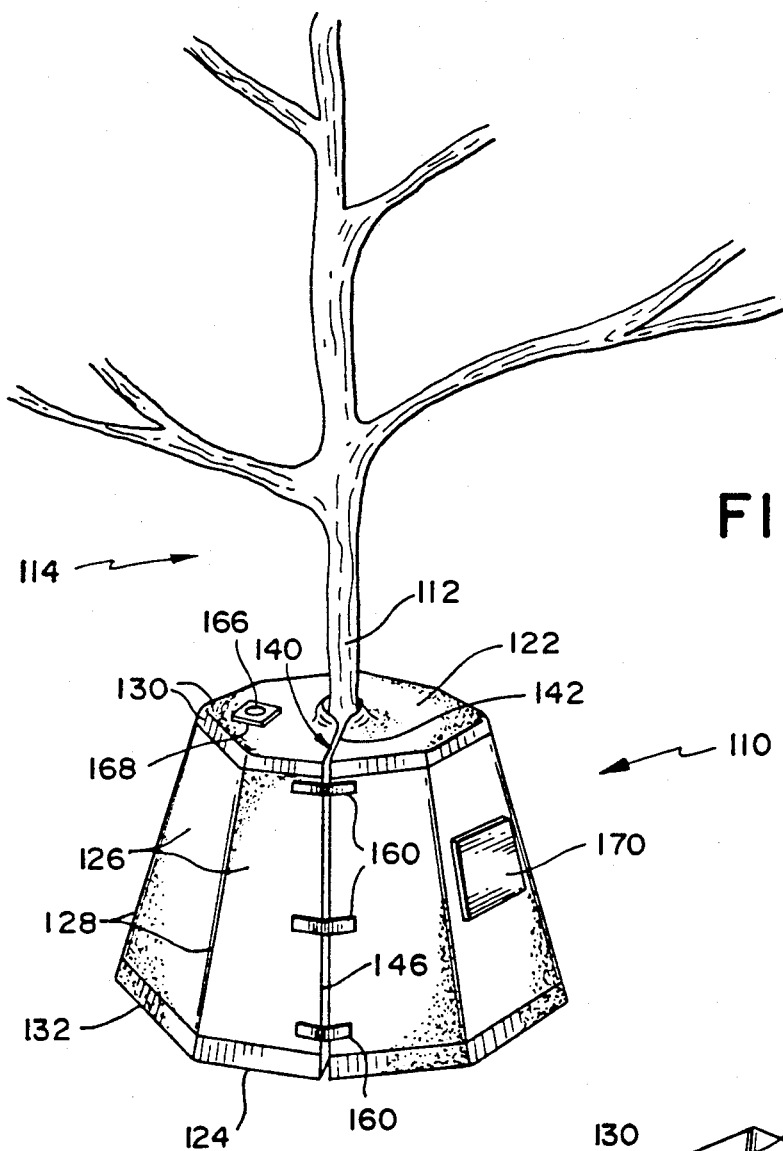
FIG. 8 is a perspective view of a third preferred embodiment of the tree irrigator of the present invention and showing the irrigator in use.

Turning now to FIG. 8, there may be seen, generally at 110, a third preferred embodiment of a tree irrigator in accordance with the present invention. Tree irrigator 110 is generally the same in purpose and usage as is the first preferred embodiment of tree irrigator 10 discussed above. This third tree irrigator 110 is utilized by placing it in a generally encircling position about a trunk 112 of a tree 114. As was the situation with the first and second preferred embodiments, this tree 114 may be newly transplanted, may be awaiting being dug for transplantation, may be out of the ground awaiting re-planting, or may be in need of watering, fertilization or the like.

Tree irrigator 110, as seen in FIG. 8, is a flexible container which is generally in the shape of a freely standable, truncated cone and having a generally planar top 122, a generally similarly shaped but larger bottom 124, and a sidewall which is preferably formed as one piece that has been cut to form a plurality of side faces 126. In the third preferred embodiment there are eight such side faces or panels 126 thus forming a generally octagonal truncated cone as the third preferred embodiment of tree irrigator 110. It will be understood that the specific number of side faces or panels 126 can be varied with this number primarily being a function of manufacturing convenience. The several side panels 126 are each integrally attached to adjacent side panels along adjoining longitudinal boundaries 128 in a manner to be discussed shortly. Upper transverse edges 130 of side panels 126 are attached to the periphery of top 122 while lower transverse edges 132 of side panels 126 are joined to the periphery of bottom panel 124 of tree irrigator 110.

Figure 9:
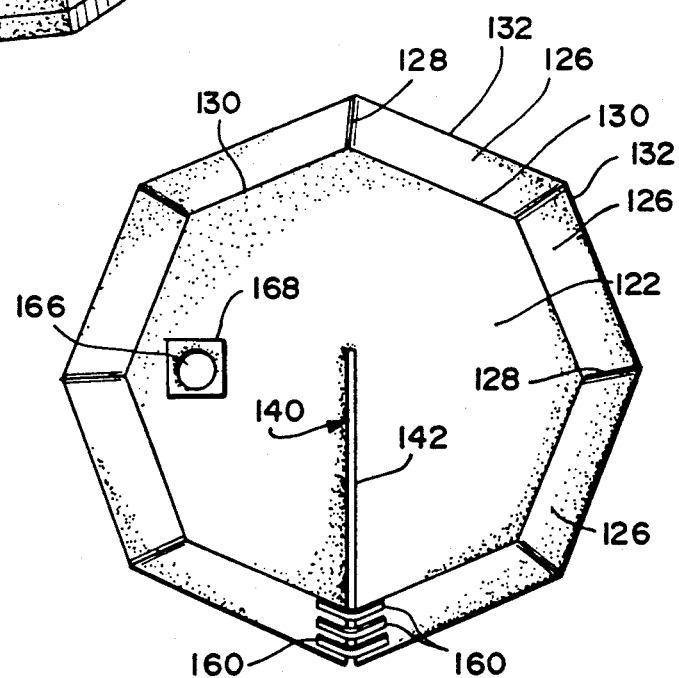
FIG. 9 is a top plan view of the tree irrigator of FIG. 7 in a use position but not in place about a tree.
Figure 10:
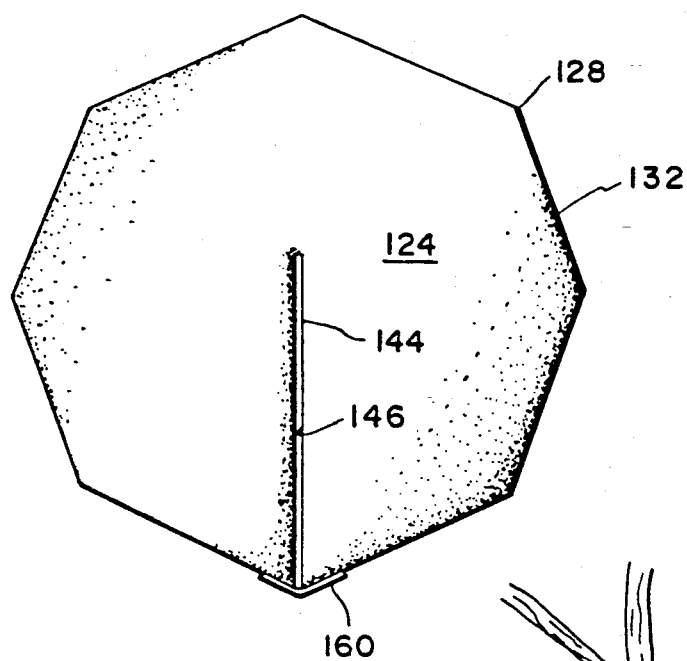
FIG. 10 is a bottom plan view of the third preferred embodiment of the tree irrigator of the present invention.

A tree trunk encompassing slot, generally at 140, is formed in tree irrigator 110. This is accomplished by forming radially extending slits 142 and 144 in upper and lower panels 122 and 124, respectively as seen in FIGS. 8, 9, and 10. A tree encompassing panel 146, is joined at its top and bottom boundaries to upper and lower slits 142 and 144, respectively, and along its side edges to adjacent longitudinal edges 128 of two adjacent side faces 126. Thus the third preferred embodiment of tree irrigator 110 can be placed about the tree by placing the trunk 112 at the inner point, or apex, of tree encircling slot 140 and by then effectively wrapping or draping the irrigator 110 about the trunk 112 until the sides of tree encompassing panel 146 are adjacent to each other and are generally parallel and vertically oriented.

A plurality of closure means generally at 160 are provided to secure the adjacent, but spaced side panel boundaries 128 on opposite sides of the tree encompassing panel 146 to each other. These closure means may be structured as hook and loop type fasteners, as straps having snaps or buttons, or as cooperating strap and hasp assemblies which would allow the use of a padlock or other suitable means to prevent the removal of tree irrigator 110 from its use position about trunk 112 of tree 114. Male and female cooperative zipper segments could also be utilized as fastening means in a manner similar to first and second preferred embodiments 10 of the tree irrigator of the present invention. A suitable fill opening 166 may be provided in upper panel 122 and may be closed with a closure flap 168 which is securable in a closed position in a manner similar to that used for closure means 160. Additionally, a name plate 170 may be affixed to one of the side faces 126 and will serve to display the name of the owner of the tree irrigator, particularly for advertising purposes.

As was alluded to previously, the third preferred embodiment of tree irrigator 110 in accordance with the present invention may utilize water permeable materials in its construction to provide a slow dispersion of the water which is initially placed in irrigator 110 through opening 166 after the irrigator has been positioned about a trunk 112 of a tree 114. In the third preferred embodiment shown in FIGS. 7-10, the entire body of tree irrigator 110 may be formed of a suitable water permeable material. In this third preferred embodiment, bottom panel 124, side panels 126 and top panel 122 may all be made of the same water permeable material. One suitable water permeable material is a spunbonded olefin made from high-density polyethylene fibers which are bonded together by heat and pressure without fillers or binders. Exemplary of such material is Tyvek ®, which is a product of E.I. DuPont. Other water permeable materials may also be used so long as they do not degrade upon exposure to water and retain their water permeability. Alternatively, in this third preferred embodiment, a non permeable material, such as a flexible plastic sheet which has been treated to render portions of it porous, could be used, to form some or all of the panels of the second embodiment 110 of the tree irrigator.

In the third preferred embodiment 110, the various panels can be joined to each other by the use of adhesive tape, heat sealing, stitching, or an adhesive. Again, the specific bonding or securing means is not crucial so long as it is strong, durable, and not subject to deterioration under the influence of water. Preferably, the tree irrigator 110 of FIG. 8 has an upper diameter of generally about 19 inches, a lower diameter of generally about 33 inches and a height of generally about 21 inches. The tree encompassing slot 140 extends into the upper and lower panels generally about 2 inches beyond center to provide sufficient space to encircle the trunk 112 of tree 114. A tree irrigator 110 having these dimensions will have a capacity of generally about 50 gallons. When tree irrigator 110 is formed from the spunbonded olefin described above, it will slowly disperse this 50 gallons of water over about a 96 hour period. This dispersal rate depends on the water permeability of the material and its area. Depending on the absorptive capabilities of the soil which will underlie the tree irrigator 110, the water permeability of the tree irrigator may be varied by proper selection of a material having suitable water permeability characteristics.

The size of the bottom panel 124 of tree irrigator 110 is selected to closely overlie the root ball of tree 114. In a typical transplanted tree having a height of 12 feet and a trunk diameter of 3 inches, this root ball will have a diameter in the range of 30-36 inches. Thus the water which slowly is dispersed through the sides 126 and bottom 124 of a tree irrigator 110 shown in FIG. 8 will be directed into the tree's root ball.

Figure 14:
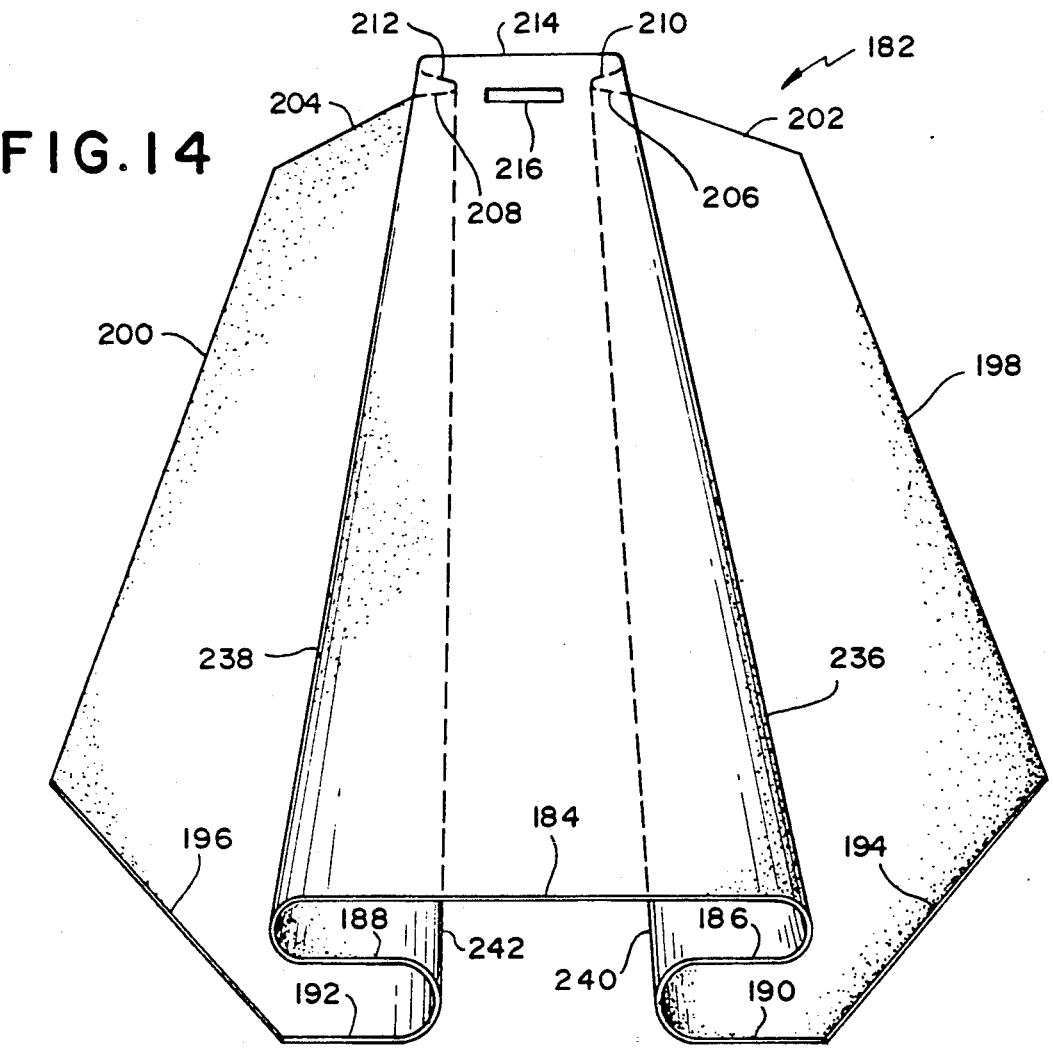
FIG. 14 is a perspective view of the outer wall blank of FIG. 12 folded with gussets as it is configured during its attachment to the inner wall blank.
Figure 15:
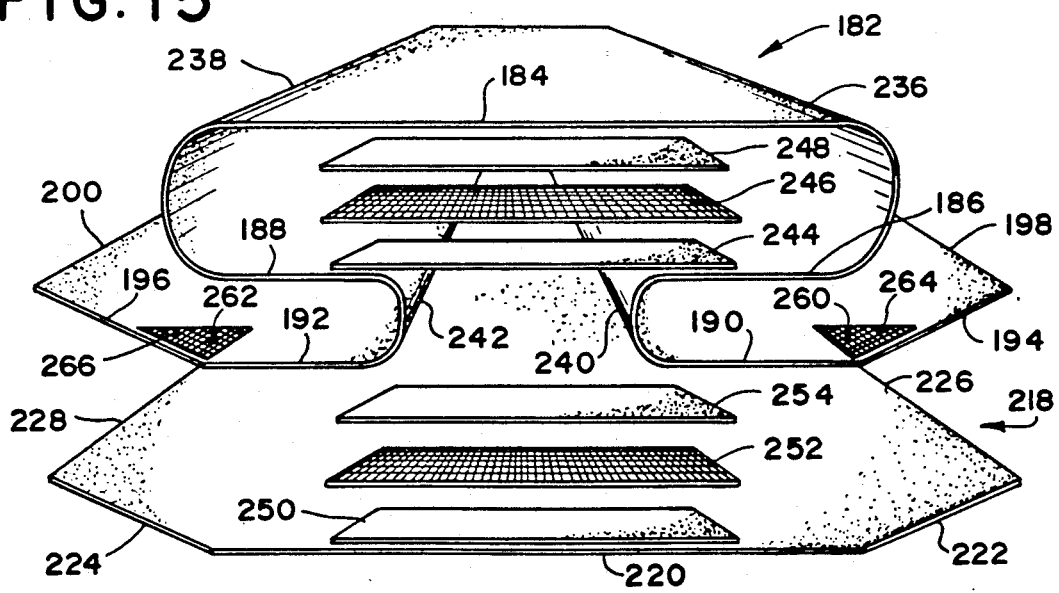
FIG. 15 is an exploded perspective view of the gusset formed bottom of the fourth preferred embodiment and showing the reinforcing scrim and netting layers.
Figure 16:
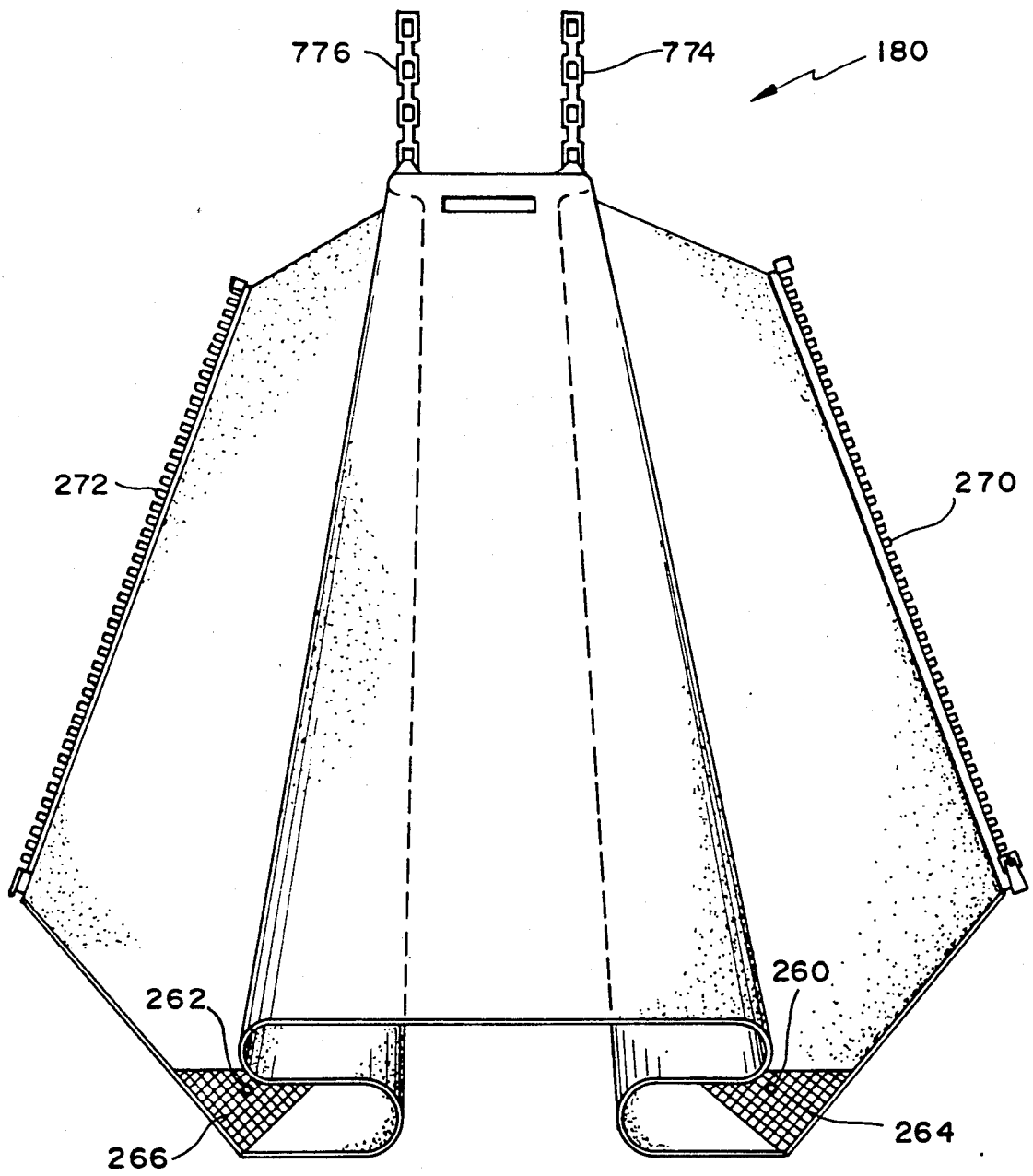
FIG. 16 is a perspective view of the container of the fourth preferred embodiment with the inner wall not shown for ease of illustration.

Turning now to FIGS. 12-16 there is shown a fourth preferred embodiment, generally at 180 in FIG. 16, of a tree irrigator in accordance with the present invention.

This fourth preferred embodiment is formed as a single layer, freely standable, shape sustaining gusset bag, generally structured somewhat similarly to inner liner 36 of the first preferred embodiment 10, while utilizing a material, such as used for the outer shell 34 of the first preferred embodiment, in conjunction with seam reinforcing means that allow the polyethylene material to be securely heat sealed together.

Figure 12:
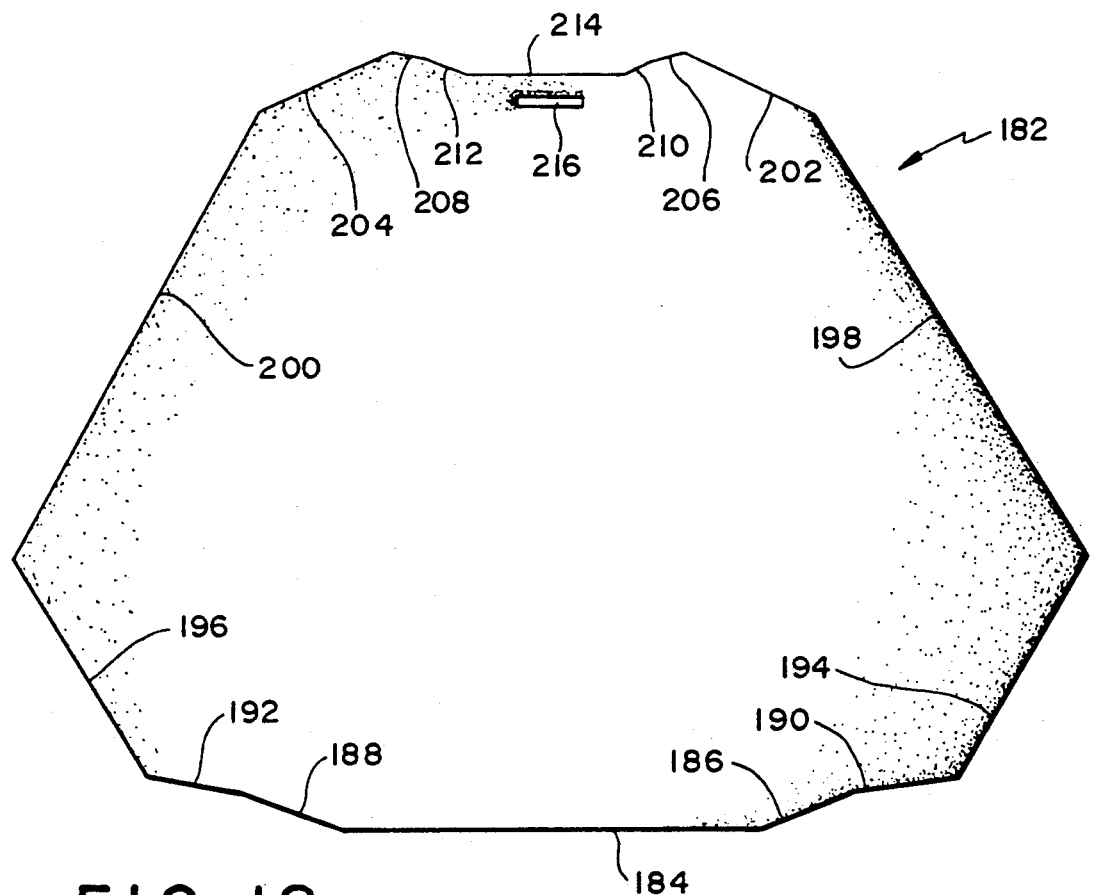
FIG. 12 is a plan view of an outer wall blank useable to form the container of the fourth preferred embodiment.

A container outer wall blank, for use in the fabrication of the fourth preferred embodiment 180 of the tree irrigation container of the present invention, is shown at 182 in FIG. 12. Container outer wall blank 182 has a bottom edge 184, right and left lower inner gusset edges 186 and 188 respectively, and right and left lower outer gusset edges 190 and 192, respectively. Right and left lower inclined edges 194 and 196 extend from the lower outer gusset edges 190 and 192 to right and left generally vertical edges 198 and 200. Continuing upwardly about the periphery of container outer wall blank 182, right and left upper inclined edges 202 and 204 extend from the upper ends of the right and left vertical edges 198 and 200 and connect to upper outer right and left gusset edges 206 and 208. Right and left upper inner gusset edges 210 and 212 are spaced apart by an upper edge 214 of container outer wall blank 182. A fill opening 216 may be formed in container outer wall blank 182 generally adjacent upper edge 214.

Figure 13:
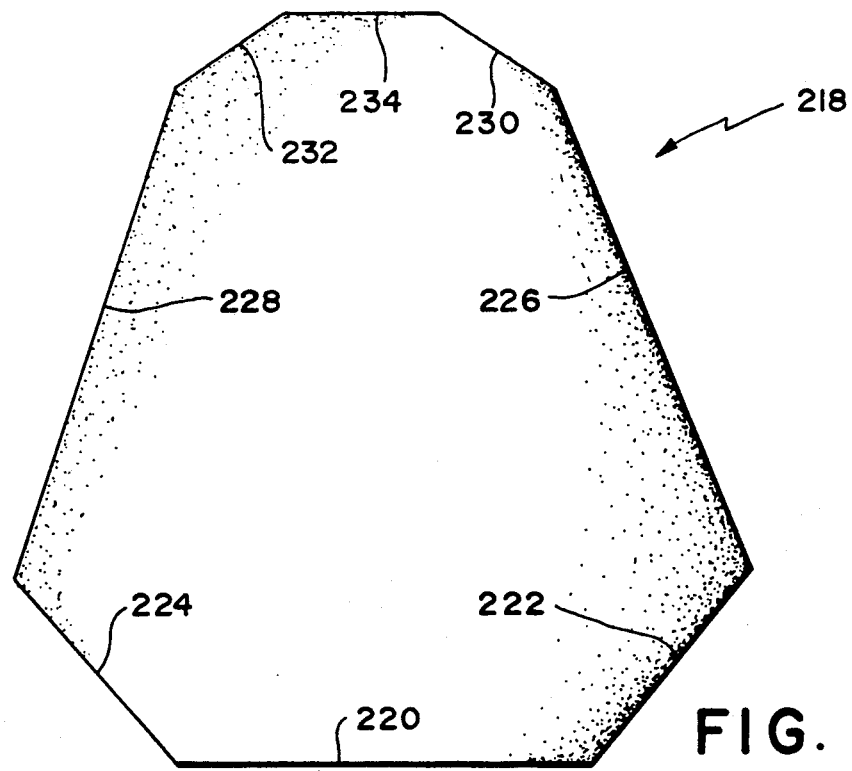
FIG. 13 is a plan view of an inner wall blank useable to form the container of the fourth preferred embodiment.

A container inner wall blank, that is useable with the container outer wall blank 182 to form the fourth preferred embodiment 180 of the container for a tree irrigator, is shown generally at 218 in FIG. 13. Container inner wall blank has a bottom edge 220, right and left lower inclined edges 222 and 224, respectively; right and left vertical edges 226 and 228; right and left upper inclined edges 230 and 232; and an upper edge 234. As will be discussed shortly, the container outer wall blank 182 and the container inner wall blank 218 are joinable together by heat sealing and stitching to form gusset container 180 useable by itself, or in conjunction with another similar gusset container 180 to form the fourth preferred embodiment of a tree irrigator of the present invention. Thus it will be understood that container outer wall blank 182 and container inner wall blank 218 are sized to cooperate to form the gusset container 180. This means that various cooperating dimensions on the two blanks, such as the lengths of outer blank vertical edges 198 and 200 are the same as the lengths of inner blank vertical edges 226 and 228.

As was mentioned earlier, these two blanks 182 and 218 are preferably formed of a material such as is used to form the outer shape sustaining shell 34 shown in FIG. 2. As discussed previously, a polyethylene sheeting material that is reinforced with a high density polyethylene scrim is ideally suited for use in making container outer and inner wall blanks 182 and 218. Product No. 6885, available from Amoco Fabrics and Fiber Company is a preferred material for this useage.

Referring now to FIG. 14, there may be seen container outer wall blank 182 folded as it will appear when placed in an overlying relationship with container inner wall blank 218, as seen in FIG. 15. By folding the container outer wall blank 182 in the manner depicted in FIG. 14 there are formed right and left outer gusset fold lines 236 and 238, and right and left inner gusset fold lines 240 and 242. All of these four gusset fold lines extend somewhat parallel to each other. However, since the container 180 that is formed when the outer and inner blanks 182 and 218 are joined together is somewhat in the shape of a truncated cone, these gusset lines converge somewhat toward each other from bottom to top.

Each of the irrigating liquid container 180 that are used to form the fourth preferred embodiment of the tree irrigator of the present invention are assembled from the two wall blanks 182 and 218 as may be seen by referring to FIG. 15. The container outer wall blank 182, which has been folded generally into the configuration shown in FIG. 14, is aligned above the container inner wall blank 218. Once the two blanks are so aligned, the right outer blank vertical edge 198 may be heat sealed to the right inner blank vertical edge 226. Then the outer blank right lower inclined edge 194 is heat sealed to the inner blank right lower inclined edge 222. This procedure is then repeated in the left vertical edges 200 and 228 and the left lower inclined edges 196 and 224. With the outer blank 182 and the inner blank now heat sealed generally to form a tube, the gusset bottom may be formed. The gusset folds 236, 238, 240, and 242 on the container outer wall blank 182 are formed so that the blank is in the configuration shown in FIGS. 14 and 15. Then a first, inner one inch wide strip of a reinforcing poly-scrim material 244, an intermediate layer of polypropylene netting 246, and a second, outer strip of poly-scrim material 248 are arranged as a first reinforcing sandwich between the lower inner gusset edges 186 and 188, and the bottom edge 184 of the container outer wall blank 182. A similar second reinforcing sandwich or laminate array of first, lower poly-scrim reinforcing strip 250, intermediate polypropylene netting 252, and second, upper poly-scrim reinforcing strip 254 is placed between lower outer gusset edges 190 and 192 of outer wall blank 182 and bottom edge 220 of container inner wall blank 218. Once the first reinforcing sandwich assembly 244, 246, and 248 and the second reinforcing sandwich assembly 250, 252 and 254 have been appropriately positioned, the assembly can be heat sealed. The heat seal will extend between the previous heat seals used to join lower inclined edges 194 and 196 of the outer wall blank 192 to lower inclined edges 222 and 224 of the inner wall blank 218. Similar heat seals may now be made to join the upper material edges 202 and 204 and the upper gusset edges 206, 208, 210 and 212, all of the outer wall blanks, to the corresponding upper inclined edges 230 and 232 of the inner wall blank 218. Concurrently, the upper edges 214 and 234 of the outer and inner blanks may also be heat sealed together thereby leaving only the fill opening 216 as the access opening into the now formed container 180 which forms the fourth preferred embodiment of the tree irrigator in accordance with the present invention.

The two reinforcing sandwich assemblies provide a very strong, durable heat seal seam that will not peel apart. The poly-scrim reinforcing strips 244, 248, 250 and 254 are preferably formed using material identified as SB-6 and which is available from Raven Industries, Inc. The polypropylene netting may be the same material as was discussed previously in connection with the spacer screen 38 shown in FIG. 2.

A pair of irrigating liquid discharge openings 260 and 262 are placed in the outer wall blank generally adjacent the juncture of the lower outer gusset edges 190 and 192 with their respective lower inclined edges 194 and 196. These discharge openings are overlaid with small spacer patches of polypropylene netting 264 and 266, as may be seen most clearly in FIG. 15. When the gusset container 180 of the fourth preferred embodiment has been full assembled and filled with an irrigating liquid. it takes on a shape sustaining and very stable configuration somewhat similar to that of the liner 36 shown in FIG. 2. In this configuration, the irrigation liquid discharge openings 260 and 262 are positioned underlying a now folded over portion of the outer wall blank and generally just outwardly of outer gusset fold lines 236 and 238. The spacer screen patches 264 and 266 insure that the irrigating liquid will be free to flow through the discharge openings 260 and 262. It has been determined that placement of these discharge openings 260 and 262 as shown in FIG. 15 will allow the discharged irrigating liquid to flow along the seam lines formed along the bottom edges 184 and 220 as well as the seam lines formed by the lower inclined edges 194 and 196 of the outer blank 182 and the lower inclined edges 222 and 224 of the inner blank 218. This flow of the irrigating liquid along these seams effects a beneficial distribution of the liquid over a large surface area.

Each gusset container 180, after it has been heat sealed as discussed above, may be provided with a male and female zipper pair 270 and 272, as seen in FIG. 16. This zipper pair is stitched or otherwise attached to the vertical sides of the now assembled gusset container. If desired, the stitch line may be continued around the entire periphery of the gusset container 180 to provide additional strength to the heat sealed seams. Tree engaging ties 274 and 276 may also be attached to the upper portion of each gusset container. These tree ties 274 and 276 may be interlockable link and loop devices or may be any other suitable type of cooperating fastener. As was the case with the containers 16 and 18 of the first and second preferred embodiments, two identical gusset containers 180 can be attached to each other in a tree trunk encircling configuration. Alternatively, one container may be placed about the trunk of a tree.

Figure 11:
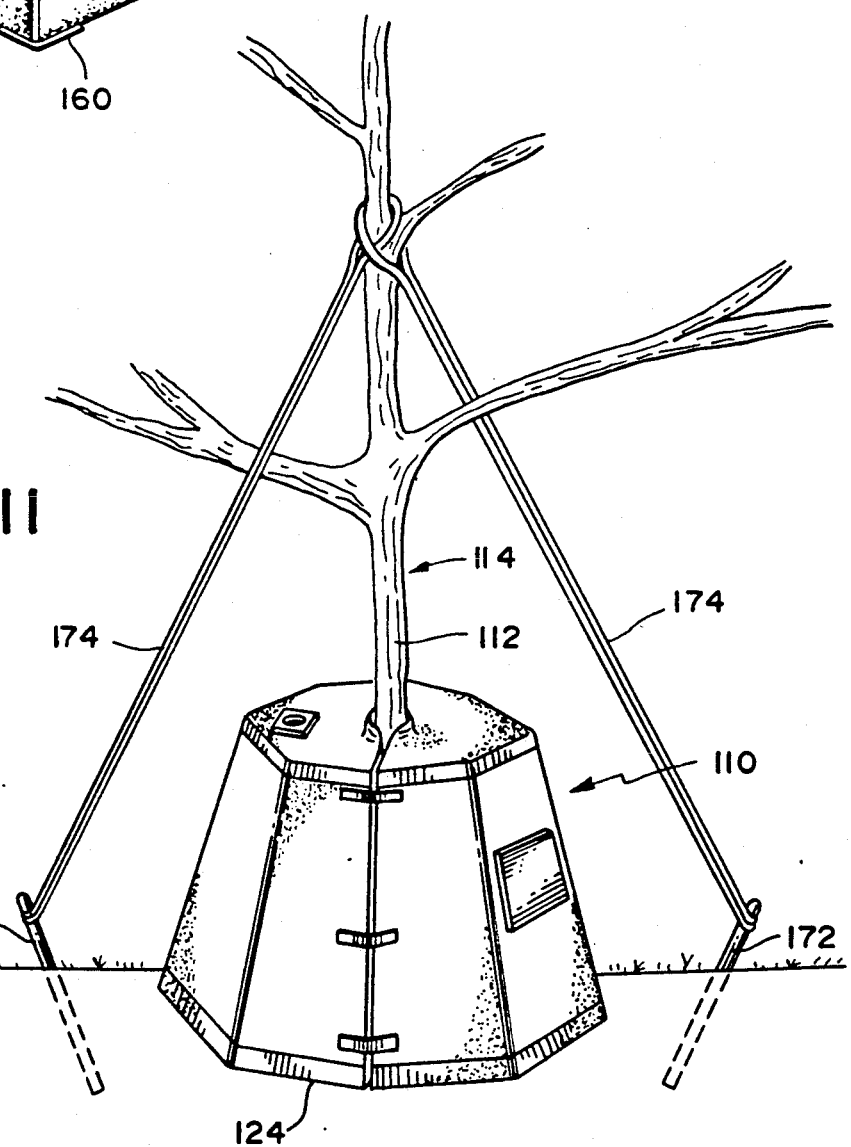
FIG. 11 is a perspective view of the tree irrigator of the third preferred embodiment and showing the tree irrigator in use with a staked tree.

The truncated cone shape of the first, second, third and fourth preferred embodiments of tree irrigator 10, 110, and 180, provides a container that is free standing, that is very stable, that does not require an undue amount of space, yet provides adequate water capacity. As may be seen in FIG. 11, this truncated, somewhat octagonal cone shaped tree irrigator 10 or 110 will not interfere with stakes 172 and tree supporting straps or guy wires 174 which may be installed after a tree 114 has recently been transplanted. Further, since the base panel 124 of tree irrigator 110 is situated directly atop the root ball of the tree and also since tree irrigator 110 is generally symmetrical about trunk 112 of tree 114, the tree is stabilized by tree irrigator 110. The slope angle of generally about 17° for the walls of each preferred embodiment of the container of the present invention makes each free standing filled container very stable.

Although not specifically depicted, it should be understood that these preferred embodiments 10, 110, and 180 of the tree irrigator are also useable about trees planted on sloping ground. The tree irrigator 10 of FIG. 1 is positioned about tree 12 so that the inner faces 40 of the two water containers 16 and 18 are generally perpendicular to the slope of the hill. The third preferred embodiment 110 of the tree irrigator is positioned in a manner such that the tree encompassing slot 140 will be oriented downhill of the tree. The bottom panel 124 will contour itself to the slope of the root ball and the surrounding ground. Since the tree trunk 112 will be generally vertical, so will the vertical axis of the tree engaging slot. The upper panel 122 of the tree irrigator will remain generally horizontal due to the flexible nature of the tree irrigator. Thus there will not be a tendency for the tree irrigator to adversely affect the orientation of the newly transplanted tree.

By providing a tree irrigator having a particular number of water exit openings 76 in outer shell 34, a specific sized water discharge opening 80 in inner liner 36 or in bottom liner 104, a water permeable area of a selected size, or having a particular size discharge opening 260 or 262, there can be provided a tree irrigator in accordance with the present invention whose irrigating liquid dispersal characteristics can be accurately selected. By considering the amount of flow required, based on the size and type of the tree to be irrigated, the soil characteristics in which the tree is placed such as sandy or clay soil, and by further considering the prevailing weather conditions, a suitable tree irrigator having the appropriate discharge capability can be provided. This water permeability may be obtained by the selection of one material having the desired flow rate and by using this material to structure the entire container; may be attained by using a non-permeable material and by providing selected permeable areas to provide the necessary permeable surface area; may be attained by using the proper outer shell exit opening configuration and inner liner discharge opening size; or may be attained by proper sizing of the irrigating liquid discharge openings. All four preferred embodiments of the tree irrigator in accordance with the present invention provide a simple, durable, inexpensive tree irrigating means which is easy to store, transport, and use; which does not require any attention, other than periodic refilling during use; and which provides a significantly better way to irrigate a tree than has been available in the past.

While preferred embodiments of a tree irrigator in accordance with the present invention have been set forth fully and completely hereinabove, it will be apparent to one of skill in the art that various changes in, for example, the water fill opening and closure configuration, the overall capacity of the tree irrigator, the liquid dispersion rates, and the like may be made without departing from the true spirit and scope of the present invention which is accordingly to be limited only by the following claims.

What is claimed is:

1. A tree irrigator useable to supply an irrigating liquid to a root ball portion of a tree, said tree irrigator comprising:
   at least a first flexible, free standing, closed shape defining container capable of holding an irrigating liquid;
   a plurality of irrigating liquid exit openings formed in a base portion of said container;
   means to position said at least first free standing container about a trunk portion of a tree with said base portion of said container being positioned generally above a root ball portion of a tree; and
   a container liner attached to said container and overlying said plurality of irrigating exit openings, said container liner being water permeable and effecting a control over the rate of irrigating liquid flow from said container through said irrigating liquid exit openings in said base panel and down to a root ball of a tree when said container is positioned about a trunk of a tree.

2. A tree irrigator useable to supply an irrigating liquid to the root ball portion of a tree, said tree irrigator comprising:

at least a first flexible gusset, shape sustaining closed container capable of holding an irrigating liquid;

means to position and to secure said at least first gusset container in an intimate encircling position about a trunk of a tree generally above a root ball portion of a tree to which the irrigating liquid is supplied; and means in said flexible gusset container to allow the dispersal of an irrigating liquid held in said flexible gusset container to a root ball of a tree, said means including at least a first irrigating liquid discharge opening in a wall portion of said flexible gusset container, said at least first discharge opening being located generally above a root ball of a tree when said flexible gusset container is positioned about a trunk of a tree and is provided with an irrigating liquid whereby irrigating liquid provided to said flexible gusset shape sustaining container will flow through said at least first irrigating liquid discharge opening in said wall portion of said flexible gusset container and will flow down to a root ball of a tree.

3. The tree irrigator of claim 2 wherein said flexible gusset container includes a container outer wall blank and a container inner wall blank, said container outer wall blank and said container inner wall blank being securable together to form said flexible gusset container.

4. The tree irrigator of claim 3 wherein said container outer wall blank includes a plurality of gusset folds which extend from a lower portion of said outer wall blank to an upper portion of said outer wall blank.

5. The tree irrigator of claim 4 wherein said container outer wall blank and said container inner wall blank are heat sealed together about their cooperating peripheries to form said flexible gusset containers.

6. The tree irrigator of claim 5 further including reinforcing means interposed between selected portion of said outer and inner wall blanks.

7. The tree irrigator of claim 6 wherein said reinforcing means includes at least a first reinforcing sandwich assembly positioned between said plurality of gusset fold lines and generally adjacent said lower portion of said container outer wall blank.

8. The tree irrigator of claim 7 wherein said reinforcing means includes a second reinforcing sandwich positioned between said first reinforcing sandwich and a lower portion of said inner wall blank.

9. The tree irrigator of claim 8 wherein said at least first reinforcing sandwich includes upper and lower layers of a polymeric scrim material and an intermediate layer of polymeric mesh.

10. The tree irrigator of claim 9 wherein said container outer wall blank and said container inner wall blank are polymeric sheets.

11. The tree irrigator of claim 4 wherein first and second discharge openings are provided in said outer wall blank generally adjacent lower ends of said plurality of gusset folds.

12. The tree irrigator of claim 2 wherein said at least first irrigating discharge opening is overlaid by polymeric mesh.

13. The tree irrigator of claim 2 further including cooperating male and female zipper segments secured to generally vertical side edges of said flexible gusset container.

14. The tree irrigator of claim 2 further including tree trunk encircling tree trunk tie means secured to an upper portion of said flexible gusset container.

15. The tree irrigator of claim 2 wherein said flexible gusset container is generally shaped as a truncated cone.

* * * * *

UNITED STATES PATENT AND TRADEMARK OFFICE
CERTIFICATE OF CORRECTION

PATENT NO. : 5,117,582

DATED : June 2, 1992

INVENTOR(S) : W. Lambert Cissel, Jr. et al.

It is certified that error appears in the above-identified patent and that said Letters Patent is hereby corrected as shown below:

Column 18: line 13:
    Claim 9, after "claim" cancel "8" and insert --7--.

Signed and Sealed this

Second Day of November, 1993

*Attest:*

BRUCE LEHMAN

*Attesting Officer*    *Commissioner of Patents and Trademarks*